(12) United States Patent
Kato et al.

(10) Patent No.: US 6,708,675 B2
(45) Date of Patent: Mar. 23, 2004

(54) EXHAUST GAS RECIRCULATION VALVE

(75) Inventors: Yasuhiko Kato, Tokyo (JP); Hisashi Yokoyama, Tokyo (JP); Eiji Numata, Tokyo (JP); Hidetoshi Okada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 212 days.

(21) Appl. No.: 09/987,091

(22) Filed: Nov. 13, 2001

(65) Prior Publication Data
US 2002/0174858 A1 Nov. 28, 2002

(30) Foreign Application Priority Data
May 28, 2001 (JP) ........................................ 2001-159228

(51) Int. Cl.[7] ................................................. F02B 47/08
(52) U.S. Cl. .............................. 123/568.12; 123/568.23
(58) Field of Search ........................ 123/568.12, 568.13, 123/568.23, 568.11, 41.01

(56) References Cited

U.S. PATENT DOCUMENTS

| 6,089,536 | A | * | 7/2000 | Watanabe et al. ...... 251/129.11 |
| 6,193,211 | B1 | | 2/2001 | Watanabe et al. |
| 6,227,183 | B1 | * | 5/2001 | Miyoshi et al. ........ 123/568.23 |
| 6,237,547 | B1 | * | 5/2001 | Ishiyama .................. 123/41.31 |

FOREIGN PATENT DOCUMENTS

| DE | 43 25 169 C1 | 9/1994 | |
| EP | 908615 A2 | 4/1999 | |
| JP | 11-117738 | 4/1999 | ............. F01P/3/14 |
| WO | WO9957428 | * 11/1999 | |

* cited by examiner

*Primary Examiner*—Mahmoud Gimie
(74) *Attorney, Agent, or Firm*—Sughrue Mion, PLLC

(57) ABSTRACT

In the wall portion of a valve housing deposed in connection with an engine block, a cooling-water-taking-out passage that has a cooling water inlet port having an opening on the to-be-connected surface of the valve housing to an engine block, and that takes out the cooling water coming from a cooling water passage of the engine block is integrally formed, and thereby the cooling water inlet port is configured to be connected with the cooling water passage.

6 Claims, 5 Drawing Sheets

EXHAUST GAS RECIRCULATION VALVE

BACKGROUND OF THE INVENTION

1. Field of the Invention

The present invention relates to an exhaust gas recirculation valve provided in an exhaust gas recirculation passage in an internal combustion engine such as a diesel engine or a gasoline engine.

2. Description of the Prior Art

FIG. 6 is a longitudinal sectional view showing the internal structure of a conventional exhaust gas recirculation valve. Referring to the figure, a valve housing 1 is disposed in connection with an exhaust gas recirculation passage (not shown) of an engine serving an internal combustion engine. The valve housing 1 has a concave portion 2 opened at the top end thereof, an exhaust gas inlet port 3 communicated with the engine exhaust system (not shown) in the lower portion of the bottom wall of the concave portion 2, an exhaust gas outlet 4 communicated with the engine air intake system (not shown), an exhaust gas passage 5 communicated with the exhaust gas inlet port 3 and exhaust gas outlet 4, and a part assembly opening 6 in the bottom portion thereof.

A valve seat 7 is press-fitted and set in the exhaust gas passage 5, a bushing 8 serving as a bearing is press-fitted and set halfway in the exhaust gas passage 5 within the valve housing 1, a valve rod 9 is slidably inserted in the bushing 8, a valve 10 is attached on the bottom end of the valve rod 9 and operable to move for closing and opening in an abutting and moving-away direction to the valve seat 7, a spring holder 11 is fixed on the top end of the valve rod 9 by caulking means, a coil spring 12 is installed between the spring holder 11 and the bottom wall of the concave portion 2, and the coil spring 12 becomes a pushing means to push the valve 10 in a valve-closing direction to abut on the valve seat 7.

A cooling water passage 13 is provided around the bottom wall of the concave portion 2 of the valve housing 1, and the cooling water passage 13 is operable to be connected with a cooling water inlet side pipe (not shown) and a cooling water outlet side pipe (not shown) for being communicated with a cooling water passage in the engine system. A holder portion 14 is integrally formed in the bottom wall portion of the concave portion 2 for preventing a deposit from entering the bushing 8 and a blocking member 15 blocks the part assembly opening 6.

A stepping motor 20 controls and drives the valve 10 in an opening and closing direction serving as a valve driving means, and a motor housing 21 houses the motor. The motor housing 21 has an opening portion on the bottom surface thereof, and a spacer 23 for water-proofing is previously clamped through a rubber seal ring 22 by a clamp screw 24 on the downward surface of the fringe in the opening portion. The motor housing 21 in which the seal ring 22 and spacer 23 are thus unitized is clamped through the spacer 23 by a mounting screw 25 on the top end portion of the valve housing 1.

Two yokes 26 for forming a magnetic path are assembled and fixed within the inner circumference surface of the motor housing 21, two coil bobbins 27 are incorporated within the yokes 26, solenoid coils 28 serving as a motor coil are wound around each coil bobbin 27, and the solenoid coils 28 are electrically connected with a terminal 29 serving as a connecter. The terminal 29 is electrically connected with the pulse-sending portion of a control unit (not shown).

A rotor 30 is rotatably held by bearings 31 and 32 inside the motor housing 21, the bearing 31 existing on the top side of the rotor 30 is incorporated in the motor housing 21, and the bearing 32 existing on the bottom side of the rotor 30 is incorporated in the spacer 23. A magnet 33 is held on the outer circumference of the rotor 30, and a motor shaft 34 is configured to threadedly penetrate the center of the rotor 30. The motor shaft 34 is located on the extended axis of the valve rod 9.

A motor bushing 36 is fit in the central opening of the spacer 23, and the motor shaft 34 is fit slidably in the motor bushing 36. A motor spring holder 37 is coupled with the bottom end portion of the motor shaft 34 and lies under motor bushing 36. A motor coil spring 38 lies between the motor spring holder 37 and spacer 23. The motor coil spring 38 becomes a pushing means of pushing the motor shaft 34 in the opening direction of the valve 10.

The operation in the conventional exhaust gas recirculation valve will next be described.

First of all, when the valve 10 is opened from the fully closing state, the solenoid coil 28 of the stepping motor 20 is excited by a pulsed voltage fed from the control unit (not shown) to the terminal 29. The rotor 30 including the magnet 33 thereby stepwise rotates in the direction of valve opening. At this stage, precise open-loop control is performed because the number of the sent pulse is coincident with the step number. This stepwise rotation is changed to a rectilinear motion by a screw feed action through the threaded engagement between the rotor 30 and motor shaft 34, and thereby the motor shaft 34 travels in the direction of valve opening. At this stage, the travel of the motor shaft 34 is assisted by the pushing force of coil spring 38. At the moment when the top end of the valve rod 9 abuts on the bottom end of the motor shaft 34 by such travel of the motor shaft 34, the valve rod 9 moves down by the driving force of the motor shaft 34 against the upward pushing force of the coil spring 12, and at the same time the valve 10 provided on the bottom end of the valve rod 9 also moves down toward the valve seat 7, to thereby open the valve. Thereby, the exhaust gas inlet port 3 and exhaust gas outlet 4 are communicated with each other through the exhaust gas passage 5.

When the valve 10 is closed, the above operation is reversed. That is, the rotor 30 containing the magnet 33 stepwise rotates in the direction of closing the valve by the pulsed voltage sent from the control unit to the terminal 29, and thereby the motor shaft 34 moves up in the direction of the closing valve. Following the movements, the valve rod 9 also moves up assisted by the upward pushing force of the coil spring 12, and thereby the valve 10 closes the opening of the valve seat 7.

Since the conventional exhaust gas recirculation valve is constructed as mentioned above, there exists the following drawbacks. Since the cooling water is introduced into the cooling water passage 13, the cooling of the system of the valve 10 containing the stepping motor 20 and valve housing 1, that is, the cooling of so-called valve body can be performed by use of the cooling water. However, because the cooling water passage 13 is provided around the valve housing 1, the size of the valve body should be large, and further piping for connecting the cooling water passage 13 to the cooling water passage of the engine system is required. Thus, this requires a dedicated water-cooling piping for the exhausted gas recirculation valve in which the number of components is large and the construction thereof is complicated, which results in high-cost.

SUMMARY OF THE INVENTION

The present invention has been accomplished to solve the above-mentioned drawback. An object of the invention is to provide an exhaust gas recirculation valve which may prevent the valve and valve-driving means in the exhaust gas recirculation system from being overheated at an elevated temperature, thereby resulting in cost-down, without a dedicated water-cooling piping for the exhaust gas recirculation valve.

Another object of the invention is to provide an exhaust gas recirculation valve in which the cooling water of the engine system can directly cool the valve housing of the exhaust gas recirculation system with efficiency.

Still another object of the invention is to provide an exhaust gas recirculation valve in which the taking-out passage of cooling water from the engine system can be easily provided within the valve housing itself.

A further object of the invention is to provide an exhaust gas recirculation valve operable not to make the pool of the cooling water within the portion of the valve housing on which the cooling water from the engine system is directly applied, and operable to thereby obtain the high circulation performance of the cooling water.

An exhaust gas recirculation valve according to the present invention comprises: a valve housing disposed in connection with an engine block having the cooling water passage of an engine system and the exhaust gas recirculation passage thereof; an exhaust gas passage formed in the interior of the valve housing and connected with the exhaust gas recirculation passage; a valve opening and closing the exhaust gas passage; and a valve-driving means driving and controlling the valve in an opening and closing direction, wherein in the wall portion of the valve housing, a cooling-water-taking-out passage having a cooling water inlet port opened in the to-be-connected surface of the valve housing to the engine block and taking out the cooling water from the cooling water passage of the engine block is integrally formed, and the cooling water inlet port of the cooling-water-taking-out passage is configured to be connected with the cooling water passage by connecting the valve housing to the engine block.

An exhaust gas recirculation valve according to the present invention comprises: a valve housing disposed in connection with an engine block having the cooling water passage of an engine system and the exhaust gas recirculation passage thereof; an exhaust gas passage formed in the interior of the valve housing and connected with the exhaust gas recirculation passage; a valve opening and closing the exhaust gas passage; and a valve-driving means driving and controlling the valve in an opening and closing direction, wherein a water outlet in which a cooling-water-taking-out passage for taking out the cooling water from the cooling water passage of the engine block is formed is integrally incorporated between the engine block and the valve housing.

The cooling-water-taking-out passage within the water outlet of an exhaust gas recirculation valve according to the present invention has an intermediate opening portion provided at a halfway position therein and operable to apply the cooling water coming from the cooling water passage of the engine block directly over the wall surface of the valve housing.

The intermediate opening portion of the cooling-water-taking-out passage of an exhaust gas recirculation valve according to the present invention is formed by partially removing the wall portion of the water outlet on the side where the outlet is connected with the valve housing.

The intermediate opening portion of the cooling-water-taking-out passage of an exhaust gas recirculation valve according to the present invention has a channel construction operable not to make the pool of the cooling water between the intermediate opening portion and the wall portion of the valve housing.

DETAILED DESCRIPTION OF THE PREFERRED EMBODIMENTS

An embodiment of the present invention will be described below.

Embodiment 1.

Figure 1:
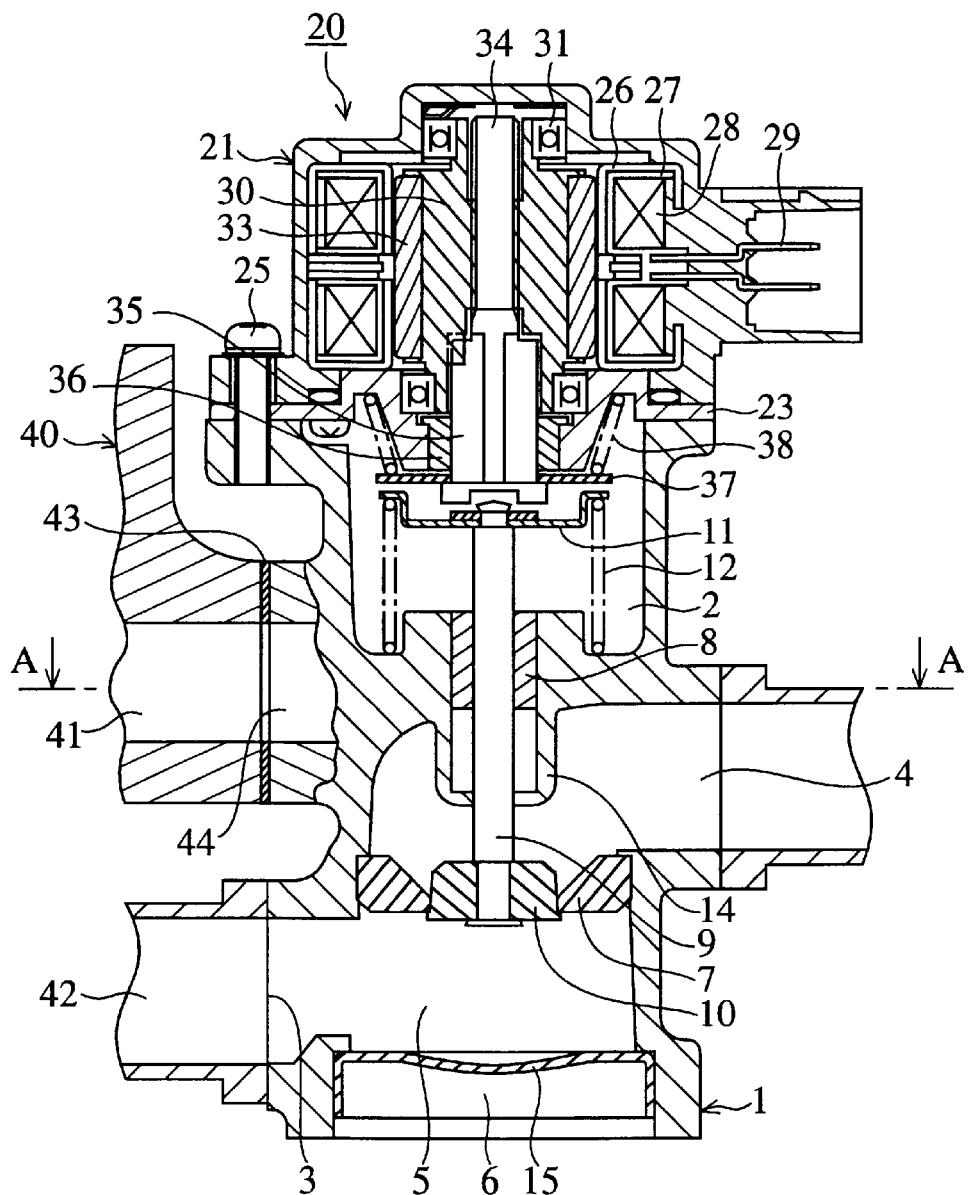
FIG. 1 is a longitudinal sectional view showing the internal structure of the exhaust gas recirculation valve according to Embodiment 1 of the present invention.
Figure 2:
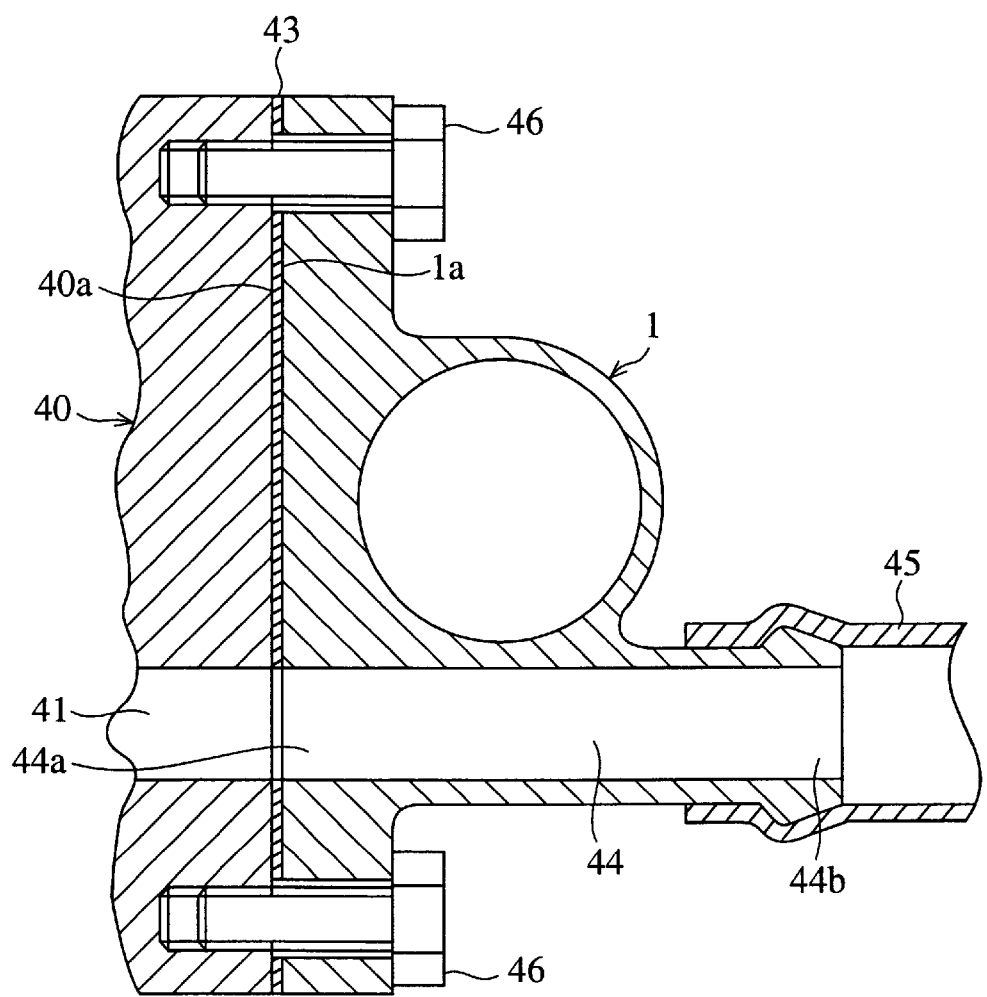
FIG. 2 is a sectional view taken along line A—A in FIG. 1.
Figure 6:
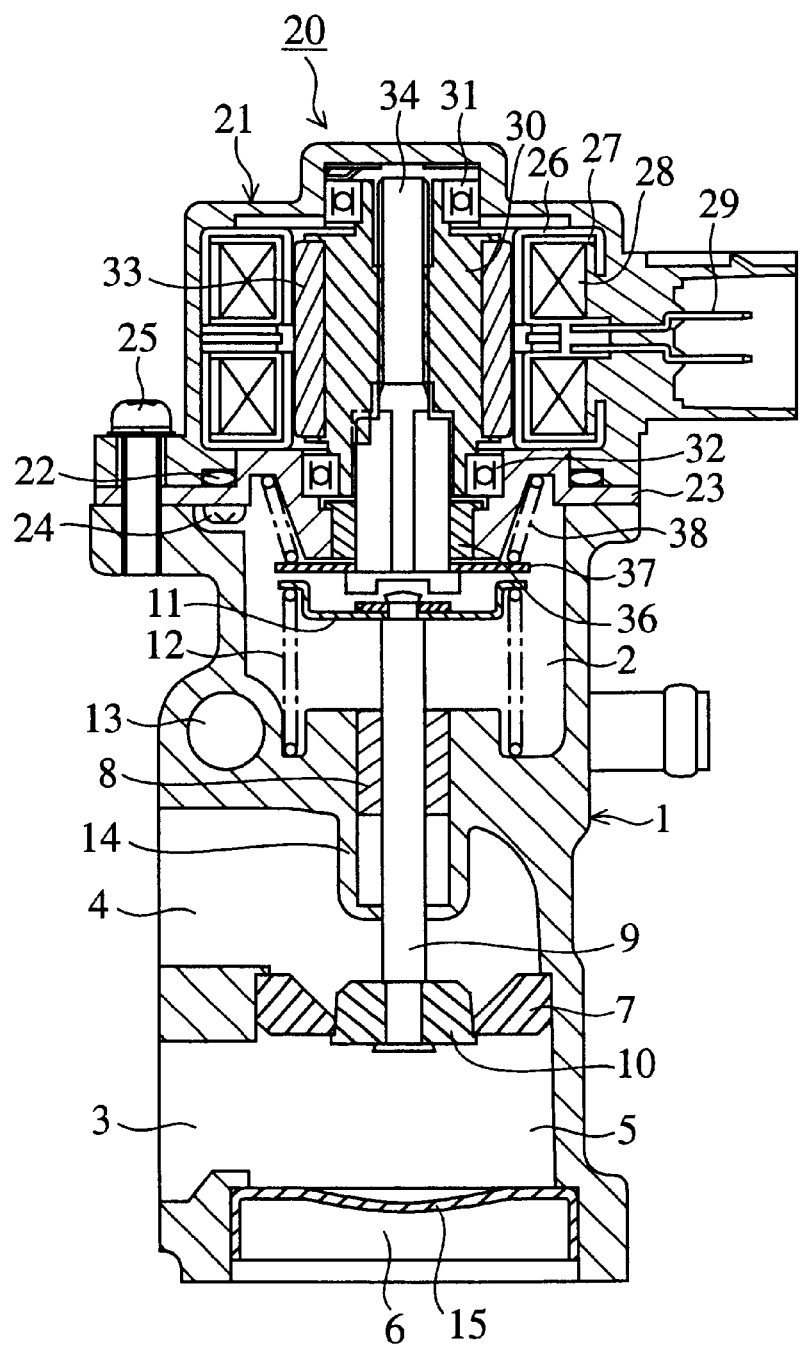
FIG. 6 is a longitudinal sectional view showing the internal structure of a conventional exhaust gas recirculation valve.

FIG. 1 is a longitudinal sectional view showing the exhaust gas recirculation valve according to Embodiment 1 of the present invention, and FIG. 2 is a sectional view taken in the direction of the arrow and along line A—A in FIG. 1. The same or corresponding parts as/to those in FIG. 6 are designated by similar numerals, to thereby avoid these redundant descriptions.

Referring to the figures, an engine block 40 is the one of a water-cooled engine, and has a housing-installing surface 40a that is in the state of a vertical surface where a valve housing 1 is to be installed. A cooling water passage 41 is provided in the engine block 40, and cools the engine system. The engine block 40 has had conventionally the cooling water passage 41. An exhaust gas recirculation passage 42 is provided in the engine block 40, and circulates the exhaust gas produced in the engine combustion chamber. Herein, the cooling water passage 41 and exhaust gas recirculation passage 42 of the engine system are configured to be opened on the housing-installing surface 40a of the engine block 40.

A to-be-connected surface 1a of the valve housing 1 is operable to be connected to the housing-installing surface 40a of the engine block 40 through a gasket 43, and the to-be-connected surface 1a is also formed in the state of a vertical surface similarly as in the housing-installing surface 40a. A cooling-water-taking-out passage 44 is provided within the valve housing 1, and the cooling-water-taking-out passage 44 functions as a cooling-water-taking-out means that takes out the engine-cooling water having a temperature that is lower than the exhaust gas temperature from cooling water passage 41 of the engine block 40.

The cooling-water-taking-out passage 44 is integrally formed in the wall portion of the valve housing 1 as shown in FIG. 2, and consists of a straight-pipe-shaped penetrating passage extending in an orthogonal direction to the to-be-connected surface 1a of the valve housing 1. The cooling water inlet port 44a of the cooling water outlet passage 44 is opened in the to-be-connected surface 1a of the valve housing 1, and in the to-be-connected surface 1a, the exhaust gas inlet port 3 of the valve housing 1 is also opened (refer to FIG. 1). A cooling water outlet 44b of the cooling-water-taking-out passage 44 is connected with a cooling water pipe 45. The bolts 46 integrally clamp the valve housing 1 to the engine block 40 through the gasket 43.

The valve housing 1 of the exhaust gas recirculation valve constructed as mentioned above is integrally connected to the engine block 40 by means of clamping by use of the bolts 46 in the state in which the to-be-connected surface 1a thereof is connected to the housing-installing surface 40a of the engine block 40 through the gasket 43. As a result, in the state in which the cooling-water-taking-out passage 44 and exhaust gas recirculation passage 42 of the valve housing 1 are directly connected to the cooling water passage 41 and exhaust gas recirculation passage 42 of the engine block 40 through the openings of the gasket 43, respectively, the valve housing 1 is incorporated and fixed to the engine block 40.

The operation of the exhaust gas recirculation valve will next be described.

Similarly as in the conventional exhaust gas recirculation valve, when the stepping motor 20 starts by a pulse signal sent from the control unit, and opens the valve 10, the exhaust gas that flows from the combustion chamber of the engine to the exhaust gas recirculation passage 42, flows to the exhaust gas outlet 4 via the exhaust gas inlet port 3, and the exhaust gas passage 5 of the valve housing 1. On the other hand, the cooling water of the engine system flows to the cooling water pipe 45 via the cooling water passage 41 of the engine block 40, the cooling water inlet port 44a of the valve housing 1, the cooling-water-taking-out passage 44 of the valve housing 1, and the cooling water outlet 44b of the valve housing 1.

Thus, since the cooling water of the engine system is directly introduced from the cooling water passage 41 of the engine block 40 to the cooling-water-taking-out passage 44 of the valve housing 1, and circulated, the high heat of the exhaust gas passing through the exhaust gas passage 5 of the valve housing 1 is absorbed and radiated by the cooling water flowing through the cooling-water-taking-out passage 44 of the valve housing 1. Accordingly, the transfer of the high heat of the exhaust gas produced from the engine system to the stepping motor 20 through the wall portion of the valve housing 1 can be suppressed, and thereby the abnormal overheating of the stepping motor 20 caused by the high heat of the exhaust gas can be prevented.

According to Embodiment 1 described above, since the engine-cooling water having a temperature that is lower than the one of the exhaust gas produced from the engine system is introduced directly from the cooling water passage 41 of the engine block 40 into the cooling-water-taking-out passage 44 integrally formed in the wall portion of the valve housing 1, to thereby circulate the cooling water, and the valve housing 1 is configured to have the stepping motor 20 disposed in the upper portion of the valve housing 1, the high heat of the exhaust gas can be absorbed and radiated in the wall portion of the valve housing 1 by the cooling water coming from the engine system. As a result, the abnormal overheating of the stepping motor 20 caused by the high heat of the exhaust gas produced from the engine system can be prevented.

Moreover, according to Embodiment 1 described above, since the cooling water inlet port 44a of the cooling-water-taking-out passage 44 integrally formed within the wall portion of the valve housing 1 is opened in the to-be-connected surface 1a of the valve housing 1 to the engine block 40, and thereby operable to be directly connected to the cooling water passage 41 of the engine block 40, no dedicated cooling water piping to connect the cooling water passage 41 of the engine block 40 and the cooling-water-taking-out passage 44 of the valve housing 1 is purposely required. Therefore, the number of components therefor and the number of man-hour for assembling the components around the engine can reduce, resulting in cost-down because of a simple construction.

Embodiment 2.

Figure 3:
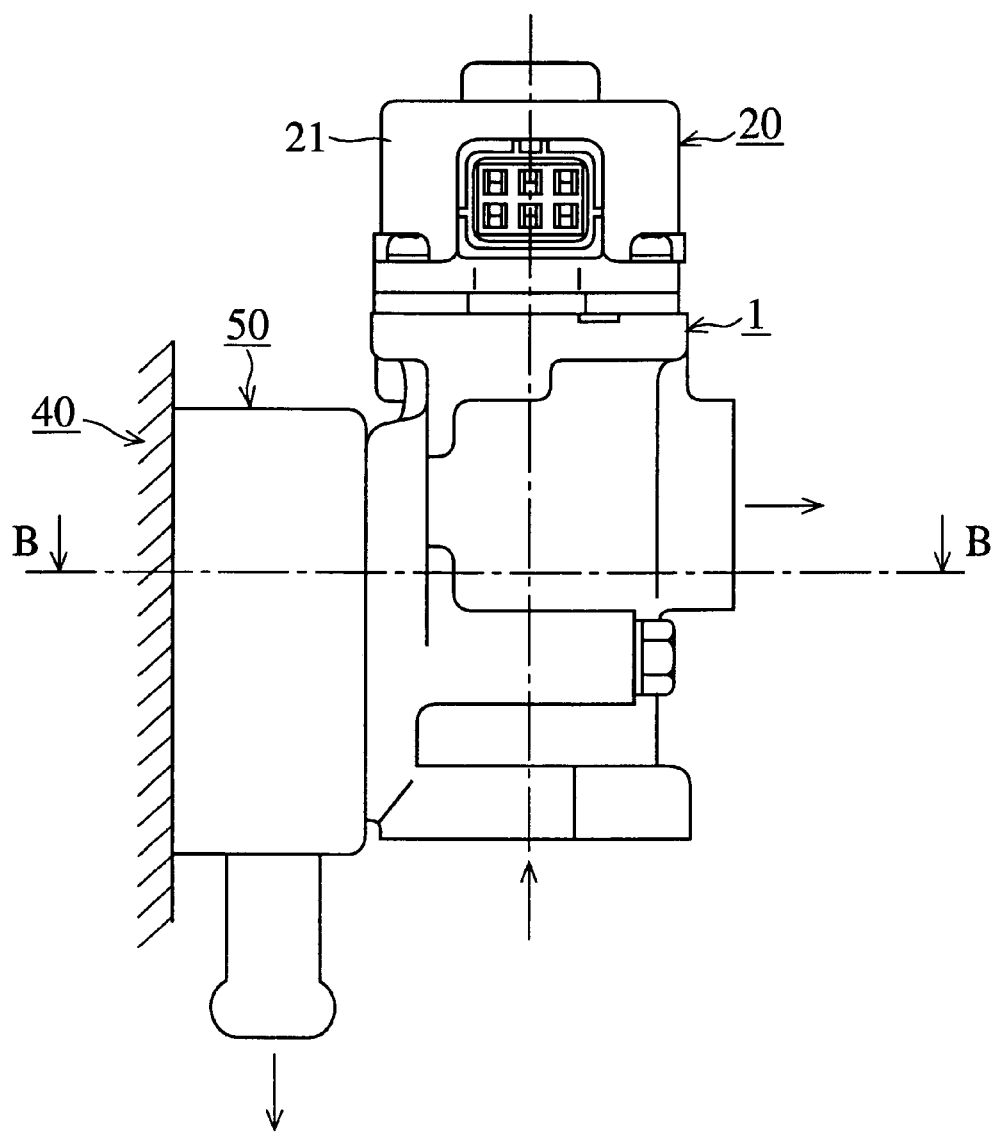
FIG. 3 is a side view showing the exhaust gas recirculation valve according to Embodiment 2 of the present invention.
Figure 4:
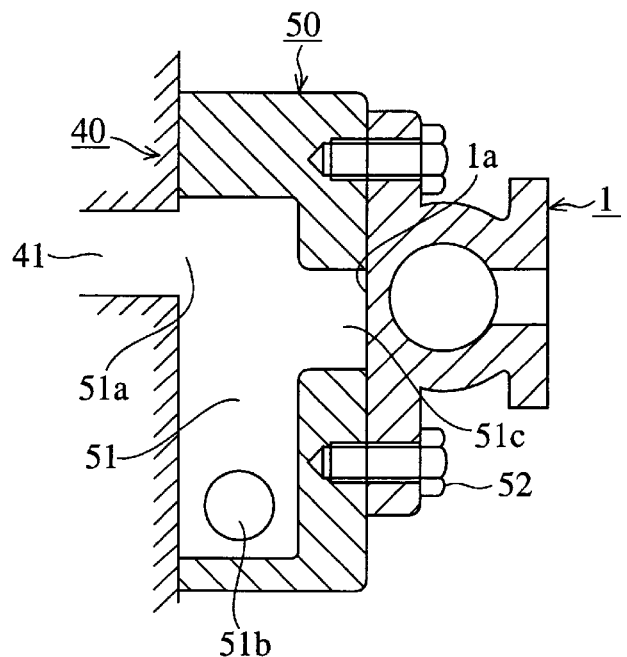
FIG. 4 is a sectional view taken along line B—B in FIG. 3.

FIG. 3 is a side view showing the exhaust gas recirculation valve according to Embodiment 2 of the present invention. FIG. 4 is a sectional view taken along line B—B in FIG. 3. The same or corresponding parts as/to those in FIGS. 1, 2, and 6 are designated by similar numerals, to thereby avoid these redundant descriptions.

Referring to FIG. 3 and FIG. 4, a water outlet 50 is interposed between the engine block 40 and valve housing 1 in an integrally connecting state, and a cooling-water-taking-out passage 51 is integrally formed within the water outlet 50. The cooling-water-taking-out passage 51 is formed in a concave cross-section within the main body wall portion of the water outlet 50, and has the structure in which the concave opened end thereof is covered by the outer wall surface of the engine block 40.

A cooling water inlet port 51a is one end of the cooling-water-taking-out passage 51, and connected to the cooling water passage 41 of the engine block 40. A cooling water outlet 51b is opened on the other end of the cooling-water-taking-out passage 51, and connected with a cooling water pipe (not shown). An intermediate opening portion 51c is opened and formed in the wall portion of the water outlet 50 on the side where the water outlet 50 is connected with the valve housing 1, and connected with the halfway portion of the cooling-water-taking-out passage 51. The intermediate opening portion 51c applies the engine cooling water flowing from the cooling water passage 41 of the engine block 40 into the cooling-water-taking-out passage 51 within the water outlet 50 directly over the wall portion of the valve housing 1, and is formed by partially removing the wall portion of the water outlet 50 on the side where the water outlet 50 is connected with valve housing 1. The opened end of the intermediate opening portion 51c is covered by the wall surface of the valve housing 1.

The operation of the exhaust gas recirculation valve will next be described.

The cooling water of the engine system flows from the cooling water passage 41 of the engine block 40 into the cooling-water-taking-out passage 51 within the water outlet 50, and dividedly flows from the cooling-water-taking-out passage 51 toward the intermediate opening portion 51c. Thereby, the cooling water directly dashes against the wall surface of the valve housing 1 exposed in the intermediate opening portions 51c, to thereby directly cool the wall portion of the valve housing 1. The cooling water having dashed against the wall surface of the valve housing 1 flows back to the cooling-water-taking-out passage 51, and then flows to the cooling water outlet 51b of the cooling-water-taking-out passage 51.

According to Embodiment 2 described above, since the water outlet 50 for taking out the engine cooling water directly from the cooling water passage 41 of the engine block 40 is configured to be integrally interposed between the engine block 40 and valve housing 1, the cooling water flowing from the cooling water passage 41 of the engine block 40 into the water outlet 50 can efficiently cool the valve housing 1. As a result, the abnormal overheating of the valve housing 1 and the stepping motor 20 caused by the high heat of the exhaust gas from the engine system may be prevented. Moreover, since the valve housing 1 doesn't need a cooling-water-taking-out passage for introducing thereinto and circulating the cooling water coming from the cooling water passage 41 of the engine block 40 or a dedicated cooling water piping for taking out the engine-cooling water, the valve housing 1 itself may be made compact, and at the same time the composition thereof may be made simple, to thereby accomplish cost-down.

Particularly, according to Embodiment 2 described above, since the water outlet 50 is operable to provide the intermediate opening portion 51c for applying the cooling water coming from the cooling water passage 41 of the engine block 40 directly over the wall portion of the valve housing 1, at the halfway position in the cooling-water-taking-out passage 51 formed between the water outlet 50 and the outer wall surface of the engine block 40, the valve housing may be further efficiently cooled with the engine-cooling water flowing from cooling water passage 41 of engine block 40 into water outlet 50.

In addition, according to Embodiment 2 described above, the intermediate opening portion 51c may be easily formed by only partially removing the wall portion of the water outlet 50 on the side where the valve housing 1 is installed. Additionally, the cooling-water-taking-out passage 51 within the water outlet 50 may be also easily formed by forming an opening in a concave cross-section on the side where the engine block 40 is connected in the water outlet 50, and then covering the concave opened end with the outer wall surface of engine block 40.

Embodiment 3.

Figure 5:
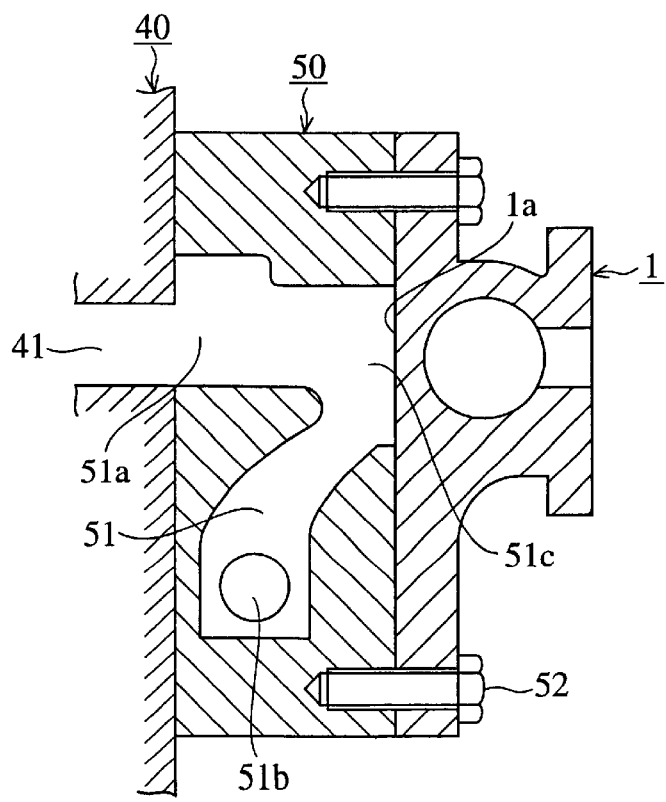
FIG. 5 is a sectional view showing the main portion of the exhaust gas recirculation valve according to Embodiment 3 of the present invention.

FIG. 5 is a sectional view showing the main portion of the exhaust gas recirculation valve according to Embodiment 3 of the present invention. The same or corresponding parts as/to those in FIGS. 1–4 are designated by similar numerals, to thereby avoid these redundant descriptions.

In Embodiment 3, the passage on the downstream side extending from the intermediate opening portion 51c in the cooling-water-taking-out passage 51 toward the cooling water outlet 51b according to Embodiment 2 is bent and formed in the shape of curvature, to thereby construct a passage having no step height between the downstream passage and intermediate opening portion 51c.

By adopting such a construction according to Embodiment 3, the cooling water flowing from the cooling water passage 41 of the engine block 40 into the cooling-water-taking-out passage 51 within the water outlet 50, and bouncing off the wall surface of the valve housing 1 in the intermediate opening portion 51c cannot stagnate around the intermediate opening portion 51c. For this reason, a high recirculation performance of the engine-cooling water may be obtained.

As mentioned above, according to the present invention, since in the wall portion of the valve housing to be disposed in connection with the engine block, a cooling-water-taking-out passage that has a cooling water inlet port opened in the to-be-connected surface of the valve housing to the engine block and is used for taking out the cooling water coming from the cooling water passage of the engine block is integrally formed, and the cooling water inlet port of the cooling-water-taking-out passage is configured to be connected with the cooling water passage of the engine block by connecting the valve housing to the engine block, a dedicated cooling water piping to connect the cooling water passage of the engine block and the cooling-water-taking-out passage of the valve housing can be needless. As a result, the effect that the number of components therefor and the number of man-hour for assembling the components around the engine can reduce, and the cost can reduce because of the simple structure is obtained.

According to the present invention, because a water outlet in which a cooling-water-taking-out passage for taking out the cooling water coming from the cooling water passage of the engine block is formed is integrally incorporated between the engine block and the valve housing, the cooling water flowing from the cooling water passage of the engine block into the water outlet can efficiently cool the valve housing. As a result, the effect that the abnormal overheating of the valve housing and the valve-driving means caused by the high heat of the exhaust gas from the engine system can be prevented is obtained.

According to the present invention, because the cooling-water-taking-out passage within the water outlet has an intermediate opening portion provided at a halfway position therein and operable to apply the cooling water coming from the cooling water passage of the engine block directly over the wall surface of the valve housing, the valve housing can be further efficiently cooled with the cooling water. As a result, the effect that the abnormal overheat of the valve housing and the valve-driving means caused by the high heat of the exhaust gas from the engine system can be further efficiently prevented is obtained.

According to the present invention, because the intermediate opening portion opened at the halfway position of the cooling-water-taking-out passage is formed by partially removing the wall portion of the water outlet on the side where the outlet is connected with the valve housing, the intermediate opening portion for applying the cooling water coming from the engine system directly over the wall portion of the valve housing can be easily formed in the water outlet. In addition, the effect that the valve housing can be efficiently cooled by only covering the intermediate opening portion with the wall surface of the valve housing is obtained.

According to the present invention, because the cooling-water-taking-out passage is configured not to make the pool of the cooling water between the intermediate opening portion of the cooling-water-taking-out passage and the wall surface of the valve housing, there remains no cooling water around the intermediate opening portion. As a result, the effect that the high recirculation performance of the cooling water can be obtained is produced.

What is claimed is:

1. An exhaust gas recirculation valve comprising:
    a valve housing disposed in connection with an engine block having a cooling water passage of an engine system and an exhaust gas recirculation passage thereof;
    an exhaust gas passage formed in the interior of the valve housing and connected with the exhaust gas recirculation passage;
    a valve for opening and closing the exhaust gas passage; and
    a valve-driving means for driving and controlling the valve in an opening and closing direction,
    wherein in the wall portion of the valve housing, a cooling-water-taking-out passage that has a cooling water inlet port opened in the to-be-connected surface of the valve housing to the engine block and is used for taking out the cooling water coming from the cooling water passage of the engine block is integrally formed, and the cooling water inlet port of the cooling-water-taking-out passage is configured to be connected with the cooling water passage of the engine block by connecting the valve housing to the engine block.

2. An exhaust gas recirculation valve comprising:

a valve housing disposed in connection with an engine block having a cooling water passage of an engine system and an exhaust gas recirculation passage thereof;

an exhaust gas passage formed in the interior of the valve housing and connected with the exhaust gas recirculation passage;

a valve opening and closing the exhaust gas passage; and a valve-driving means driving and controlling the valve in an opening and closing direction, wherein a water outlet in which a cooling-water-taking-out passage for taking out the cooling water from the cooling water passage of the engine block is formed is integrally incorporated between the engine block and the valve housing.

3. An exhaust gas recirculation valve according to claim 2, wherein the cooling-water-taking-out passage within the water outlet has an intermediate opening portion provided at a halfway position therein and operable to apply the cooling water coming from the cooling water passage of the engine block directly over the wall surface of the valve housing.

4. An exhaust gas recirculation valve according to claim 3, wherein the intermediate opening portion of the cooling-water-taking-out passage is formed by partially removing the wall portion of the water outlet on the side where the outlet is connected with the valve housing.

5. An exhaust gas recirculation valve according to claim 3, wherein the intermediate opening portion of the cooling-water-taking-out passage has a channel construction operable not to make the pool of the cooling water between the intermediate opening portion and the wall portion of the valve housing.

6. An exhaust gas recirculation valve according to claim 4, wherein the intermediate opening portion of the cooling-water-taking-out passage has a channel construction operable not to make the pool of the cooling water between the intermediate opening portion and the wall portion of the valve housing.

* * * * *